April 29, 1958 F. S. SCHADE 2,832,467

FILE CARD CONTAINER FOR HOUSING COMPUTER TAPES

Filed Feb. 10, 1956

INVENTOR.
FRANK STANLEY SCHADE
BY
Chapin & Neal
ATTORNEYS

United States Patent Office 2,832,467

Patented Apr. 29, 1958

2,832,467

FILE CARD CONTAINER FOR HOUSING COMPUTER TAPES

Frank Stanley Schade, Holyoke, Mass., assignor to National Blank Book Company, Holyoke, Mass., a corporation of Massachusetts Application February 10, 1956, Serial No. 564,820

4 Claims. (Cl. 206—80)

This invention relates to a record keeping file card container and is particularly adapted to house a plurality of recording tapes folded in strip form.

An object of the invention is to provide a convenient and easily handled container card which may be stored in conventional record keeping file card holder equipment and which will retain for convenient accessibility a plurality of folded strips of tape such as are used in electronic computer machines for business accounting purposes.

The container cards of this invention may be stored in a vertically stacked arrangement as in a conventional file cabinet or box; they may be adapted for threading in a loose leaf ring binder; or they may be otherwise maintained in record holding equipment of the usual type as will be apparent.

The above and other specific objects and advantages will be apparent from the following description of an embodiment of the invention as shown by the accompanying drawings.

Figure 1:
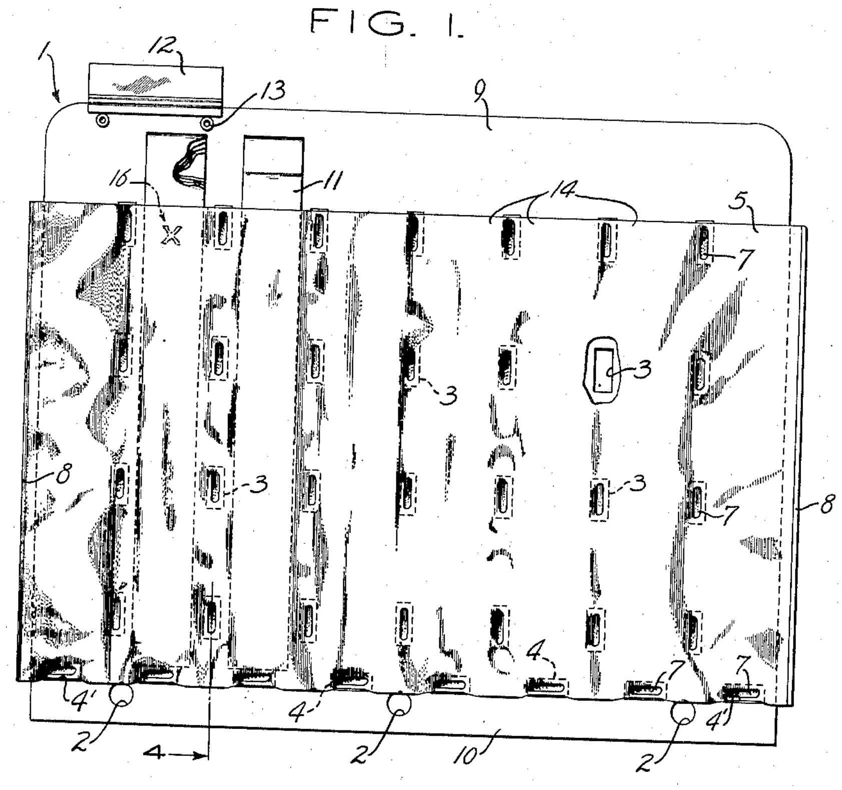
Fig. 1 is a plan view of a container card adapted for use with a three ring loose leaf binder.

The container card (Fig. 1) is formed with a panel or divider member 1 of suitable stiff card material. In the panel at its lower or inner marginal portion are provided spaced circular openings 2 for appropriately threading on suitable binding rings of a loose leaf binder mechanism (not shown). As will be obvious the card may also be used for vertically stacking with others in a filing cabinet drawer or other standard file box equipment.

The divider is formed with a plurality of perforations shown as rectangular openings 3. These are arranged in a series of parallel sets or rows as the four openings 3 shown for each of the vertical rows of Fig. 1. In an intermediate position between each of the adjacent rows defined by the aligned sets of openings is a perforation 4 transversely positioned as at the inner marginal edge portion of the divider and defining an end limit between said rows. Additionally, a transversely positioned opening 4' is provided outwardly of each row adjacent the opposite side edges of the divider. The openings 4 and 4' are also arranged in alignment and are located along the inner marginal edge portion of the divider inwardly from the position of the aligned openings 2.

Overlying opposite side faces of the divider member 1 are two sheets 5 and 6 of limp flexible plastic sheet material, preferably of a heat sealable character such as polyvinyl chloride which is naturally stretchable. The sheets 5 and 6 overlie the openings 3, 4, and 4', and may extend as shown beyond the opposite end edges of the divider. In the areas of the openings the sheets are bonded together through the divider as by suitable heat sealing tools to form bonded or fused areas as designated by the numeral 7. At the opposite edges of the sheets parallel with the rows of openings 3 the sheets are provided with a sealed band as at 8.

The sheets 5 and 6 are preferably spaced from the upper and lower edges, an upper marginal area 9 of the divider being provided above the edges of sheets 5 and 6, while at the bottom the edges of the sheets are inwardly of the aligned ring openings 2. The lower marginal portion 10 is provided for a binding edge as for attaching in a loose leaf binder. The upper portion 9 forms an extension beyond the open ends of the pockets 14 formed by the sealed sheets 5 and 6 so that the folded tapes 11, which are to be housed in the pockets, will have a backing against which they may slide in the pockets and the tapes grasped by the user's fingers for ready removal from the card. At the upper edge of this portion an index tab 12 may also be fixed to the divider by riveting at 13.

The pocket forming portions at 14 of the sheets 5 and 6, as will be noted, are loose and slack to provide a fullness between the rows of sealed areas 7 at either side of the divider partition 1. Preferably, the fused or bonded areas at 7 are appreciably smaller in dimension than the rectangularly elongated openings 3 to permit a loose shucking fit of these areas at the openings, and particularly in a lateral direction. When the tapes are inserted in the pockets at either side of the divider the sheet material of an individual pocket will thus readily accommodate tapes of different thicknesses and the sheets at both sides will be adjusted to varying conditions depending on the location and number of tapes housed in the various pockets. It will be readily understood that in the assembly of the sheets on the divider "forming" fingers of suitable dimensions as to width and thickness may be laid against the member 1 to provide the type of fullness desired in the pockets. At the edges of the divider the overlap of the sealed border 8 beyond the same will provide a fullness and slack for the end pockets.

Figure 4:
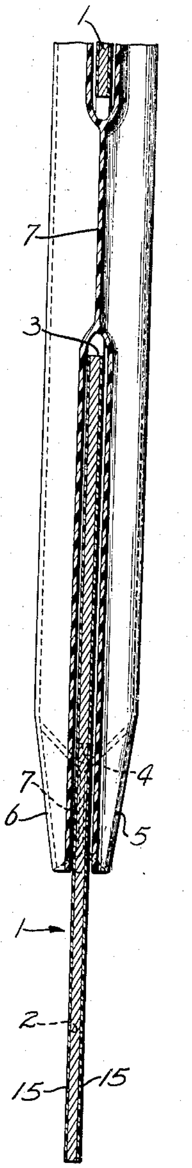
Fig. 4 is a fragmentary sectional view on a greatly enlarged scale taken on line 4—4 of Fig. 1.
Figure 2:
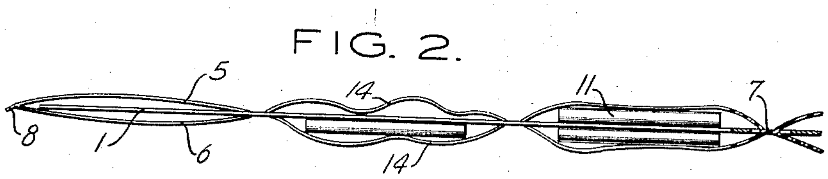
Fig. 2 is a fragmentary edge view on an enlarged scale of a container card as from the upper edge of Fig. 1.
Figure 3:
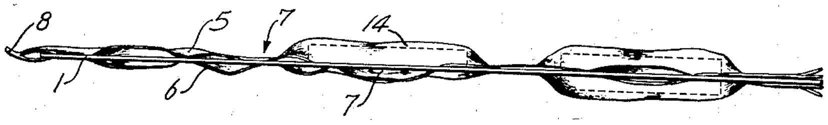
Fig. 3 is a fragmentary edge view on an enlarged scale of a card as from the lower edge of Fig. 1.

Inasmuch as the strip of tape as used in electronic computing machines may be of a plastic oil-impregnated type it has been shown by Fig. 4 that the stiff divider partition 1 is preferably faced on each side with a plastic coating as at 15. Such a coating will protect the stiffener member 1 from deterioration or discoloration by oily substances.

In the event additional identification of the card container contents is desired beyond that of an index tab 12, the individual pockets may be identified by suitable marking on the sheets 5 and 6 as indicated by the X at 16. Alternatively the marking may be imprinted on the divider panel above individual pockets, or, the tapes themselves appropriately marked. The sheets 5 and 6 may be transparent, translucent or opaque material.

What is claimed is:

1. A filing card container for strip record tapes comprising a stiff panel member having sets of aligned spaced perforations arranged in spaced parallel rows across the face thereof, a limp pliable sheet overlying each opposite side of the member, said sheets in the mating areas registering with said perforations being bonded together with the bonded areas appreciably less than the areas of the associated perforations and defining the lateral edges of pockets formed thereby with said panel member at opposite sides thereof.

2. A filing card container for strip recording tapes comprising a stiff panel backing member and at each side thereof a limp flexible sheet of heat sealable and stretchable material overlying the panel member, a plurality of sets of spaced aligned perforations in said panel arranged in laterally spaced parallel rows, said perforations having a substantial length in the direction of said rows, the portions of said limp sheets between said rows being loose and slack with the areas of said sheets oppositely mating with the perforations being heat sealed together to form the lateral side edges of a series of adjacent pockets across each side face of the panel, said perforations being spaced apart along said rows a substantial distance for said material to shift laterally between said perforations in the rows to accommodate the filling of said pockets to varying degrees of fullness and at one end of each pocket a transversely positioned perforation with the areas of said sheets registering therewith being heat sealed together and forming a closed end for the pocket.

3. A filing card container as in claim 2 in which said perforations of said parallel rows are rectangularly formed with the longer dimension thereof aligned with said rows, the said heat sealed areas being of a substantially lesser dimension than said perforations and providing lateral play of said pocket forming limp sheets to conform to the contents of said pockets.

4. A filing card container for strip recording tapes comprising a stiff panel backing member and at each side thereof a limp, flexible sheet of heat sealable and stretchable material overlying the panel member and extending beyond the side edges thereof, a plurality of spaced aligned perforations in said panel arranged in laterally spaced parallel rows, said perforations having a substantial length in the direction of said rows, the portions of said limp sheets between said rows being loose and slack with areas of said sheets oppositely mating with the perforations being heat sealed together to form the lateral side edges of a series of adjacent pockets across each side face of the panel, said perforations being spaced apart along said rows a substantial distance for said material to shift laterally between said perforations in the rows to accommodate the filling of said pockets to varying degrees of fullness and the portions of the sheet material extending beyond the side edges of the panel being heat sealed together to form pockets at each extreme edge thereof, each of said flexible sheets being spaced below the upper edge of said panel member to provide backing means to facilitate the introduction of strip recording tapes into an entrance end of the pockets so formed, and adjacent the lower edge of the panel and at the opposite end of each pocket a transversely positioned perforation with the areas of said sheets registering therewith being heat sealed together to form end closures for the pockets.

References Cited in the file of this patent

UNITED STATES PATENTS

| | | |
|---|---|---|
| 962,595 | Smith | June 28, 1910 |
| 962,895 | Gardner | June 28, 1910 |
| 1,183,370 | Garfield | May 16, 1916 |
| 1,678,621 | Holmes | July 24, 1928 |
| 1,971,996 | Tete | Aug. 28, 1934 |
| 1,977,667 | Breitkreuz | Oct. 23, 1934 |
| 2,647,071 | Schade | July 28, 1953 |
| 2,676,704 | Marks | Apr. 27, 1954 |

FOREIGN PATENTS

| | | |
|---|---|---|
| 707,234 | Great Britain | Apr. 14, 1954 |